UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING MAGNESIUM CHLORIDS AND THE LIKE.

1,209,246.  Specification of Letters Patent.  Patented Dec. 19, 1916.

No Drawing.  Application filed April 17, 1916. Serial No. 91,786.

*To all whom it may concern:*

Be it known that I, EDWIN O. BARSTOW, a citizen of the United States, and a resident of Midland, county of Midland, State of Michigan, have invented a new and useful Improvement in Methods of Making Magnesium Chlorids and the like, of which the following is a specification, the principle of the invention being herein explained and the best mode in which I have contemplated applying that principle, so as to distinguish it from other inventions.

The present improved method of manufacturing magnesium chlorid may be regarded as a modification or improvement of the process which forms the subject matter of my co-pending application filed March 13, 1916, Serial No. 83,880.

As in the process of such companion case the object of the present invention is the provision of a simple and practicable process for making magnesium chlorid from natural brines, such as occur, for example, in the Michigan district, which contain sodium chlorid and calcium chlorid, in addition to such magnesium chlorid.

To the accomplishment of the foregoing and related ends, said invention, then, consists of the steps hereinafter fully described and particularly pointed out in the claims.

The following description sets forth in detail certain steps embodying the invention, such described steps constituting, however, but one of various ways in which the principle of the invention may be used.

In the process as described in my aforesaid co-pending application, I replace the calcium chlorid in the brine with magnesium chlorid by treating such brine with magnesium sulfite according to the following reaction:

$$CaCl_2 + MgSO_3 = CaSO_3 + MgCl_2$$

In order, however, to carry out the foregoing reaction, it is necessary of course to first provide the necessary magnesium sulfite, this being prepared preliminarily to the main step of the process. By the present improved process, however, I propose to eliminate this preliminary step and to precipitate the calcium in the form of the sulfite directly. In carrying out such improved process, I mix magnesium hydrate with brine of the character described, and then pass sulfur dioxid ($SO_2$) into the mixture. The products that result are calcium sulfite precipitate and a magnesium chlorid, sodium chlorid brine, just as in the first mentioned process. The reaction occurring may be represented as follows:

$$CaCl_2 + Mg(OH)_2 + SO_2 = CaSO_3 + MgCl_2 + H_2O$$

After filtering off the calcium sulfite precipitate produced by the foregoing reaction, a solution of the sodium and magnesium chlorids is accordingly left. Where it is desired to use the magnesium chlorid as such, it is recovered from this solution by evaporating the same until the sodium chlorid separates out, which takes place at a gravity of about 34° Bé. The mother liquor, containing the magnesium chlorid, is then evaporated until it corresponds in composition to the chlorid with water of crystallization ($MgCl_2.6H_2O$), when it is drawn off into drums and allowed to cool and solidify. Should it, on the other hand, be desired to obtain the magnesium in the form of a salt, for example, the carbonate, which is insoluble in the combined solution, such solution may be treated with sodium carbonate, which precipitates the magnesium as magnesium carbonate. The latter may then be readily separated from the residual sodium chlorid solution by well understood methods. Also instead of treating the original brine with magnesium hydroxid and sulfur dioxid, I can, if desired, preliminarily evaporate such brine to remove the salt (NaCl) leaving a solution of calcium and magnesium chlorids, and then treat this solution in the fashion above described to convert the calcium chlorid to magnesium chlorid.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. In a method of making magnesium chlorid from a solution containing calcium chlorid, the steps which consist in mixing magnesium hydrate with such solution, and then passing in sulfur dioxid, whereby calcium sulfite is precipitated and magnesium chlorid left in solution.

2. In a method of making magnesium chlorid from a brine containing sodium chlorid and calcium chlorid in addition to magnesium chlorid, the steps which consist in mixing magnesium hydrate with such brine, and then passing in sulfur dioxid, whereby the calcium chlorid is precipitated as calcium sulfite, leaving a solution of sodium and magnesium chlorids, and then separating such last-named chlorids, substantially as described.

3. In a method of making magnesium chlorid from a brine containing sodium chlorid and calcium chlorid in addition to magnesium chlorid, the steps which consist in mixing magnesium hydrate with such brine, and then passing in sulfur dioxid, whereby the calcium chlorid is precipitated as calcium sulfite, leaving a solution of sodium and magnesium chlorids, evaporating such solution to a point where the sodium chlorid crystallizes out, and then separating out such crystallized sodium chlorid, leaving the magnesium chlorid in solution.

Signed by me, this 13th day of April, 1916.

EDWIN O. BARSTOW.

Attested by—
J. P. HOLMES,
C. E. BARNES.